United States Patent
Brown et al.

(10) Patent No.: US 8,200,656 B2
(45) Date of Patent: Jun. 12, 2012

(54) INFERENCE-DRIVEN MULTI-SOURCE SEMANTIC SEARCH

(75) Inventors: Eric W. Brown, Hawthorne, NY (US); Jennifer Chu-Carroll, Hawthorne, NY (US); James J. Fan, Hawthorne, NY (US); David A. Ferrucci, Hawthorne, NY (US); David C. Gondek, Hawthorne, NY (US); Anthony T. Levas, Hawthorne, NY (US); James William Murdock, IV, Millwood, NY (US)

(73) Assignee: International Business Machines Corporation, Armonk, NY (US)

( * ) Notice: Subject to any disclaimer, the term of this patent is extended or adjusted under 35 U.S.C. 154(b) by 184 days.

(21) Appl. No.: 12/620,279

(22) Filed: Nov. 17, 2009

(65) Prior Publication Data
US 2011/0119254 A1 May 19, 2011

(51) Int. Cl.
*G06F 17/30* (2006.01)
(52) U.S. Cl. ...................................................... 707/713
(58) Field of Classification Search .............. 707/2, 718, 707/713; 705/2
See application file for complete search history.

(56) References Cited

U.S. PATENT DOCUMENTS

| | | | |
|---|---|---|---|
| 6,363,377 B1 * | 3/2002 | Kravets et al. | 1/1 |
| 7,035,864 B1 | 4/2006 | Ferrari et al. | |
| 7,062,483 B2 | 6/2006 | Ferrari et al. | |
| 7,325,201 B2 | 1/2008 | Ferrari et al. | |
| 7,984,043 B1 * | 7/2011 | Waas | 707/718 |
| 2006/0178908 A1 * | 8/2006 | Rappaport | 705/2 |
| 2006/0235843 A1 | 10/2006 | Musgrove et al. | |
| 2009/0089277 A1 | 4/2009 | Cheslow | |

* cited by examiner

*Primary Examiner* — Etienne Leroux
(74) *Attorney, Agent, or Firm* — Scully, Scott, Murphy & Presser, P.C.

(57) ABSTRACT

A method, system and computer program product are disclosed for searching for information using a knowledge base. In one embodiment, the method comprises receiving a query; formulizing the query, including dividing the query into a plurality of parts; for each of the parts, identifying a source, using the knowledge, that addresses that part; and combining the sources to answer the query. In one embodiment, the query includes text; the text is separated into a plurality of segments; and, for each of the segments, at least one source is identified addressing the segment. In an embodiment, a logical proof is formulated having a conclusion that is an answer to the query, and a sequence of statements that establish said conclusion; and a proof of this conclusion is generated by identifying two or more documents that assert the sequence of statements.

20 Claims, 10 Drawing Sheets

256

| ? | Sample Search Application | ☒ |

What cities are in the USA ?  [Search]

Chicago
states.txt    Illinois is in the USA
cities.txt    Chicago is in Illinois

Detroit
USstates.txt    Detroit is in the USA

Newark
USstates.txt    Newark is in the USA

FIG. 9

FLOW CHART: INDEXING TIME

FLOW CHART: THEOREM PROVING WITH SEARCH & TEMPLATES

INFERENCE-DRIVEN MULTI-SOURCE SEMANTIC SEARCH

BACKGROUND OF THE INVENTION

1. Field of the Invention

This invention generally relates to information retrieval, and more particularly, to an inference-driven multi-source semantic search.

2. Background Art

Information retrieval from a database of information is an increasingly challenging problem, particularly on the World Wide Web (WWW), as increased computing power and networking infrastructure allow the aggregation of large amounts of information and widespread access to that information. A goal of the information retrieval process is to allow the identification of materials of interest to users.

As the number of materials that users may search increases, identifying materials relevant to the search becomes increasingly important, but also increasingly difficult. Challenges posed by the information retrieval process include providing an intuitive, flexible user interface and completely and accurately identifying materials relevant to the user's needs within a reasonable amount of time. The information retrieval process comprehends two interrelated technical aspects, namely, information organization and access.

One fundamental search technique is the keyword-index search that revolves around an index of keywords from eligible target items. In this method, a user's inputted query is parsed into individual words (optionally being stripped of some inflected endings), whereupon the words are looked up in the index, which in turn, points to documents or items indexed by those words. Thus, the potentially intended search targets are retrieved. This sort of search service, in one form or another, is accessed countless times each day by many millions of computer and Internet users.

Two main problems of keyword searches are (1) missing relevant documents, and (2) retrieving irrelevant ones. Most keyword searches do plenty of both. In particular, with respect to the first problem, the primary limitation of keyword searches is that, when viewed semantically, keyword searches can skip about 80% of the eligible documents because, in many instances, at least 80% of the relevant information will be indexed in entirely different words than words entered in the original query. For simple searches with very popular words, and where relevant information is plentiful, this is not much of a problem. But for longer queries, and searches where the relevant phrasing is hard to predict, results can be disappointing.

Semantic searching is an improvement in keyword searching. Semantic search systems index and retrieve information based upon the ascertained meaning of information passages contained in a corpus of information. In the case of written language, words are analyzed in context, with understanding given to accepted meaning and grammar. This semantic analysis is performed by natural language understanding programs that create complex and often copious data structures that set forth the semantic relationships found in the analyzed data. At search time, natural language queries are translated into similar data structures. Relevant data is retrieved from the corpus of information by comparing the data structures generated for the query against the data structures generated for the information passages.

Current state-of-the-art information retrieval and question answering systems attempt to satisfy a user's information need by identifying the single source (e.g., document, passage, or phrase) that is most likely to contain relevant information. There are many information needs that cannot be satisfied by a single source. Rather, the information retrieval system must identify a number of relevant sources and further analyze or synthesize the information contained in those segments to satisfy the user's information need.

BRIEF SUMMARY

Embodiments of the invention provide a method, system and computer program product for searching for information using a knowledge base. In one embodiment, the method comprises receiving a query; formulizing the query, including dividing the query into a plurality of parts; for each of said parts, identifying a source, using the knowledge, that addresses said each part in a defined manner; and combining said sources to provide an answer to the query.

In one embodiment, the query includes text; the dividing includes separating the text of the query into a plurality of text segments; and the identifying includes, for each of the text segments, identifying at least one source, by using the knowledge base, addressing said each text segment in said defined manner.

In an embodiment, the dividing includes formulating a logical proof having a conclusion that is an answer to the query, and a sequence of statements that establish said conclusion; and the identifying includes generating a proof of said conclusion by using the knowledge base to identify a set of two or more documents that assert said sequence of statements.

In one embodiment, each of said sequence of statements is asserted by one of said documents and no one of the documents proves said conclusion, and said proof requires all of the documents in said set of documents.

In one embodiment, the generating includes generating a plurality of proofs of said conclusion, each of said proofs having an associated sequence of statements. In this embodiment, the knowledge base may be used to identify, for each of said plurality of proofs, an associated set of documents that assert the sequence of statements associated with said each proof. Also, these sets of documents may be ordered according to a given one or more criteria such as, for example, relevance and parsimony.

In an embodiment, the knowledge base includes a repository of assertions, and the method further comprises building said repository from a defined group of documents, and this building may include linking each of the assertions to one of the documents, of said defined group of documents; that asserts said each assertion. In this embodiment, the generating may include, for each of said statements, identifying one of the assertions in the knowledge base that asserts said statement; and using said identified assertions and said linking to identify one of the documents, of said defined group of documents, that assert said identified assertion.

An embodiment of the invention uses logical proofs to guide search. A final conclusion that is produced in response to a query may be only indirectly derived from content found in multiple documents. For example, a question such as "What country is Chicago in?" might be answered by separate documents that state that "Chicago is in Illinois" and that "Illinois is in the USA." Once a system has derived a conclusion (e.g., that Chicago is in the USA), it may be expected to provide support for that conclusion by citing original sources.

There may be multiple distinct proofs that can be found for any given conclusion. Each of these proofs will involve some set of assertions that are directly asserted in source material. Any given assertion may be stated in one or more sources. Some assertions are "leaves" of the proof tree; they occur only in the source material and are not computed from other assertions. Non-leaf assertions are derived from other assertions and may be directly stated in the sources. A leaf assertion is supported by any document that asserts it. A non-leaf assertion is supported by any document that asserts it or by the documents that support for each of the assertions that it was directly computed from. For example, the assertion locatedIn (Illinois, USA) may have two alternative sets of support: states.txt, which directly asserts it, and stateRegions.txt plus regionCountries.txt, which support each of the assertions directly used to compute it.

Some queries have responses that have multiple instances, each with one or more supporting documents. For instance, a question such as "What cities are in the USA?" has many different answers and some of those answers may be asserted in a single document while others may emerge only from the combination of multiple documents.

BRIEF DESCRIPTION OF THE SEVERAL VIEWS OF THE DRAWINGS

FIG. 9 depicts a user interface that may be used in the practice of the present invention.

DETAILED DESCRIPTION

Figure 1:
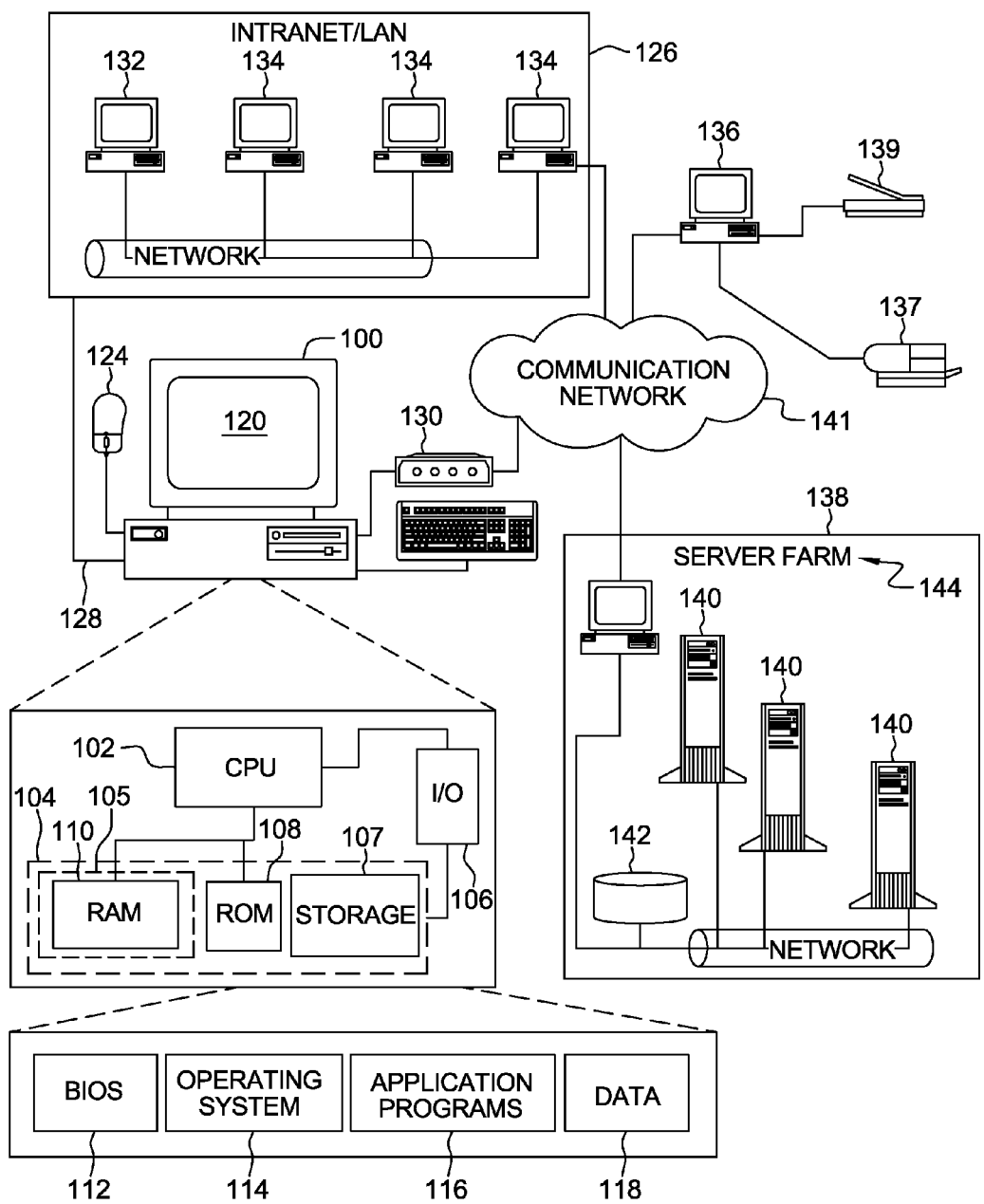
FIG. 1 is a block diagram of an exemplary computing system in which the present invention may be embodied.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium, upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The block diagram shown in FIG. 1 illustrates an exemplary computer system. A computer 100 includes a central processing unit (CPU) 102, a system memory 104, and input/output (I/O) ports 106.

The system memory 104 includes working memory 105 and storage memory 107. The working memory 105 is generally addressable by the central processing unit (CPU) 102 and includes random access memory (RAM) 110. The CPU 102 can read from and write to RAM 110 at or near bus speeds. The CPU 102 can also read from, but not write to, read-only memory ROM (108), which is generally used to provide the CPU with very fast access to non-volatile information required at start-up or during operation of the computer 100.

Storage memory 107 includes memory that is generally not directly addressable by the CPU, and is thus not available to be acted upon by processor instruction performed by the CPU 102 without an intervening transfer of the information stored in the storage memory 107 to the working memory 105. The storage memory 107 is operably connected to the working memory 105, generally via an input/output bus (I/O) 106, such that information stored in the storage memory 107 can be transferred to the working memory 105.

The system memory 104 contains a basic input/output system (BIOS) 112 for administering the basic input and output between components of the computer, an operating system 114 for providing the basic software services provided by the computer and application programs 116 that provide the functionality for performing specific tasks with the computer. Data may be stored and manipulated in the system memory 104 by any of the BIOS 112, operating system 114 and application programs 116.

The computer 100 has a display 120 for output of information and input devices, such as a keyboard 122, or a pointer device, such as a mouse 124. Peripheral devices such as a scanner 139 or printer 137 may be attached to a computer 136 to extend the computer's abilities. Suitable computers include conventional mainframe computers, server computers, personal computers, notebook computers, handheld computers, personal digital assistants, personal information managers, and hybrid devices incorporating computer capabilities, such as cable boxes, cellular telephones, and pagers.

The computer may be connected to a local area network (LAN or intranet) 126 through a network connector 128 or through a modem 130. A LAN 126 includes a server computer 132 and a plurality of client computers 134, which are all functionally similar to computer 100. The computer 100 or the LAN 126 may be connected to other computers 136 or other networks 138 through a communication network 141 to form a wide area network (WAN). The Internet is an example of a large scale WAN that connects together many computers 100.

Server computers 140 (functionally similar to computer 100 but generally more powerful) store application programs 116 and data 118 that are communicated to other computers for instance, 100, 134 and 136, connected to a network. In some cases, server computers 140 are interconnected to form parallel processing networks. These networks are designed to process applications concurrently by dividing tasks among the various server computers and combining results. The dividing, processing and combining of results may be accomplished many times while an application runs.

A typical search environment can be comprised of large numbers of electronic documents all or any part of which may be defined as a corpus. An electronic document, Web document or simply, "document," includes a grouping of electronic data. A document is a grouping of electronic data partitioned from the corpus at any level. For instance, a document may comprise a complete Web site, a page, a paragraph, a clause, a sentence, an abstract or any granularity or combination of electronic information drawn from the corpus.

A subset of documents is defined to be included in an index, such as all electronic documents accessible to a firm's internal network. A separate or combined index may define all electronic documents accessible via the Web. An index, therefore, has a domain that includes the documents indexed and the type of information indexed.

Semantic search systems index and retrieve information based upon the ascertained meaning of information passages contained in a corpus of information. In the case of written language, words are analyzed in context, with understanding given to accepted meaning and grammar. This semantic analysis is performed by natural language understanding programs that create complex and often copious data structures that set forth the semantic relationships found in the analyzed data. At search time, natural language queries are translated into similar data structures. Relevant data is retrieved from the corpus of information by comparing the data structures generated for the query against the data structures generated for the information passages.

Generally, a semantic search has three phases: an indexing phase, a retrieval phase, and a match phase. During the indexing phase, a corpus of information is parsed and translated into semantic representations. These semantic representations are generally stored as data structures in a database for use in later comparison with semantic representations generated for search queries. A pre-selection of the semantic representations to be compared against the semantic representation of a search query is performed in the retrieval phase. These pre-selected "candidate" semantic representations are matched against the semantic representation of the search query in a match phase.

Information may be grouped in passages of varying granularity. A passage may be of any granularity that gives context to its contents. For example, a passage might encompass a document, a section, a chapter, a paragraph, a sentence or a phrase. In general, the more information contained in a passage, the larger a semantic representation would be for that passage.

As mentioned above, current state-of-the-art information retrieval and question answering systems attempt to satisfy a user's information need by identifying the single source (e.g., document, passage, or phrase) that is most likely to contain relevant information. There are many information needs that cannot be satisfied by a single source. Rather, the information retrieval system must identify a number of relevant sources and further analyze or synthesize the information contained in those segments to satisfy the user's information need.

The present invention effectively addresses this challenge by taking a complex query, i.e., one that may require information from multiple sources to address it, dividing the query into parts, and finding sources (e.g., text documents, databases, images, etc.) that address each of the parts. In one embodiment, the way that the query is divided into parts is to take the text of the query and break it into smaller segments of text. In another embodiment, the query is divided up logically, into logical assertions that together establish that some answer is the answer to the question. In both cases, the parts are related to sources that address those parts.

Figure 2:
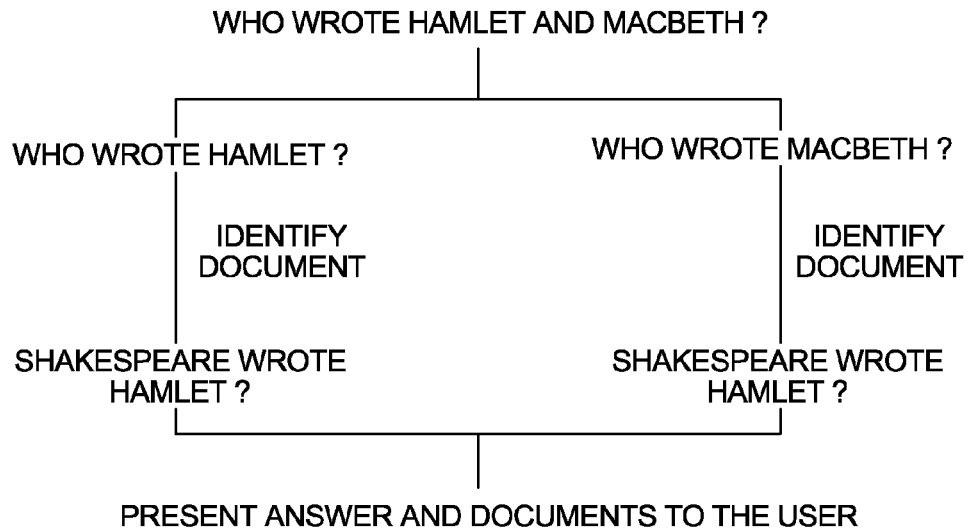
FIG. 2 illustrates an example query that is answered in accordance with an embodiment of the invention.

FIG. 2 illustrates, as an example, the query: Who wrote Hamlet and Macbeth?

In the embodiment in which a query is broken into smaller segments of text, we address this query as follows. This query is divided into two (overlapping) sub-queries: "Who wrote Hamlet?" and "Who wrote Macbeth?" Keyword search is used to find documents that are relevant to those two queries. One document is found that says Shakespeare wrote Hamlet. Another document is found that says Shakespeare wrote Macbeth. Pre-existing natural-language processing technologies are used on each document to extract that information. This provides one answer to both sub-queries and it is the same answer. This answer is presented to the user along with the two documents, each of which answers one of the sub-queries.

Using the logic (theorem proving) embodiment of the invention, the query is addressed as follows. First the text query is converted into a logical query, e.g., wrote(?x, Hamlet) and wrote(?x, Macbeth. Then a knowledge base and a theorem prover are used to develop a proof that binds the variable, ?x, to a value, Shakespeare. The atomic assertions used in this proof are wrote(Shakespeare, Hamlet) and wrote (Shakespeare, Macbeth). The knowledge-base contains links from those atomic assertions to documents that assert these facts. The answer plus these documents are presented to the user.

Figure 3:
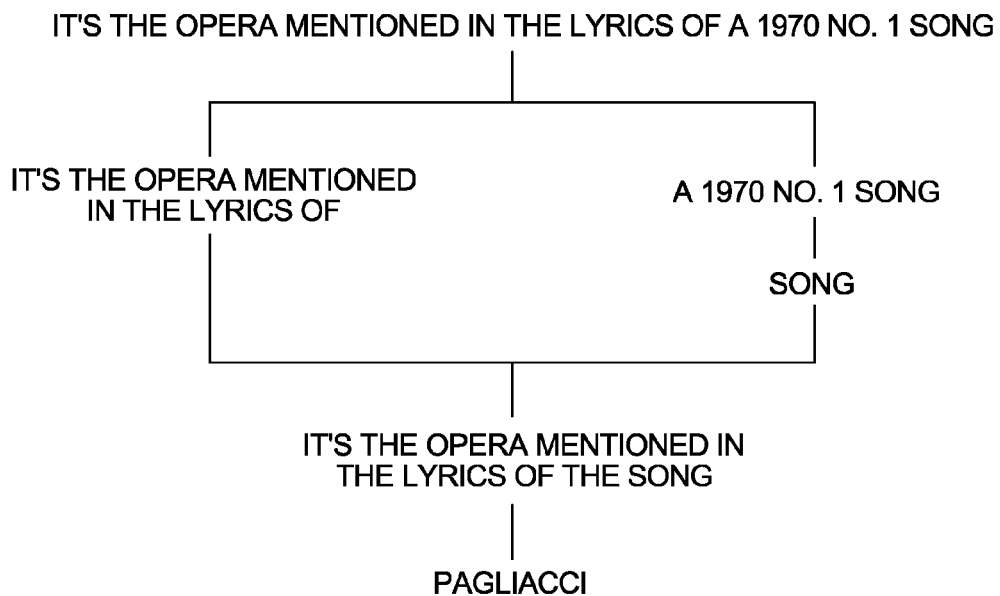
FIG. 3 shows another example query that is answered in accordance with an embodiment of this invention.

FIG. 3 shows, as another example, the query: It's the opera mentioned in the lyrics of a 1970 No. 1 song by Smokey Robinson and The Miracles.

In the instantiation in which a query is broken into smaller segments of text, this query is addressed as follows. This query is divided into parts: "It's the opera mentioned in the lyrics of . . . ", and "a 1970 No. 1 song by Smokey Robinson and The Miracles". When a search is conducted on the second part, a document is found that indicates that Tears of a Clown is a 1970 No. 1 hit song by Smokey Robinson and The Miracles. If that result is combined with the first part of the question, a new sub-query is obtained: "It's the opera mentioned in the lyrics of Tears of a Clown." The final answer, Pagliacci, is presented to the user along with the document that says that Tears of a Clown is a 1970 No. 1 song by Smokey Robinson and The Miracles and the document that says that Pagliacci is the opera mentioned in Tears of a Clown.

Similarly, this query could also be addressed by logic and theorem proving.

FIGS. 4-13 illustrate additional examples and aspects of embodiments of the invention.

Figure 4:
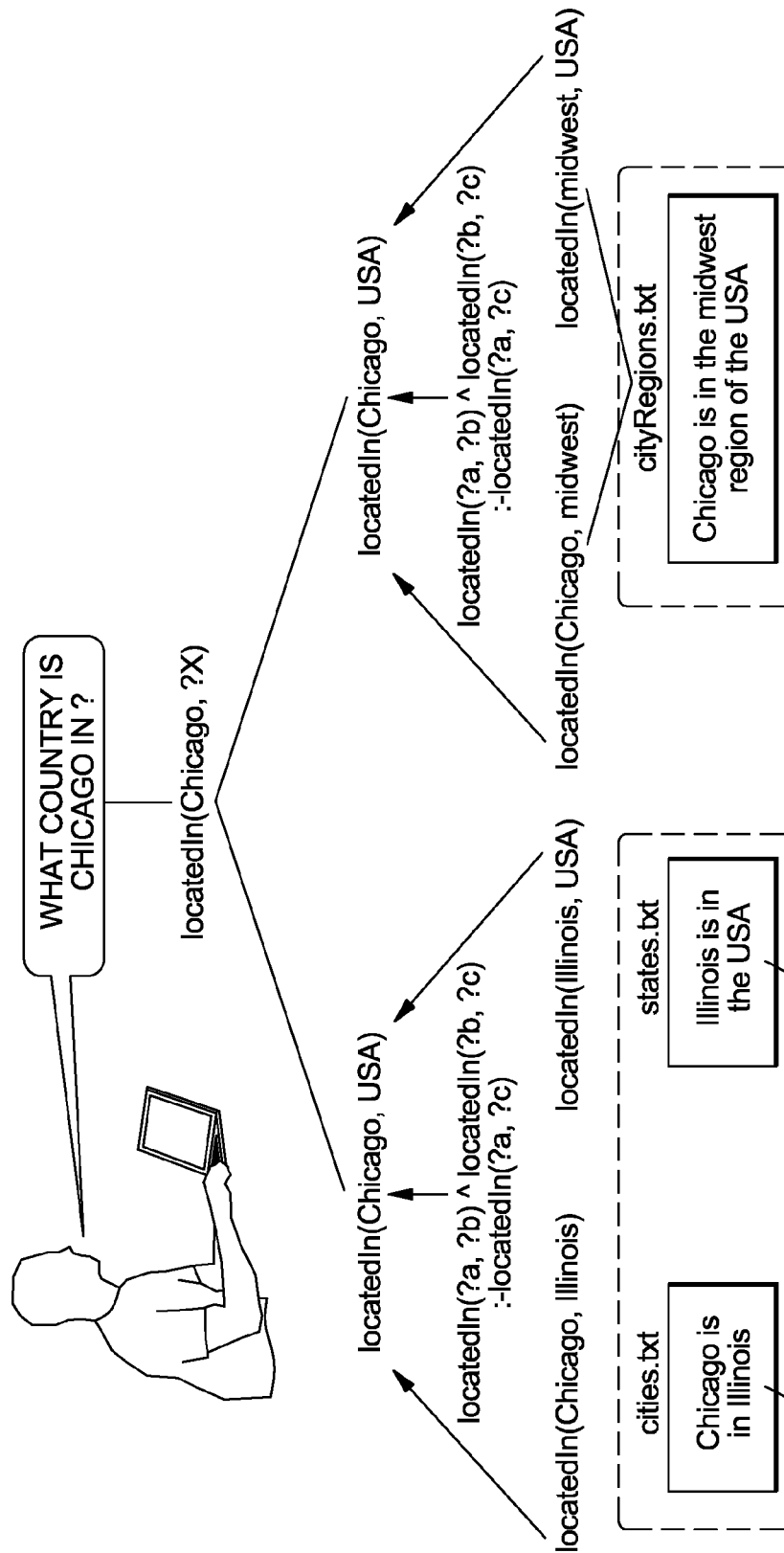
FIG. 4 illustrates an example question that is answered by a combination of separate documents.
Figure 5:
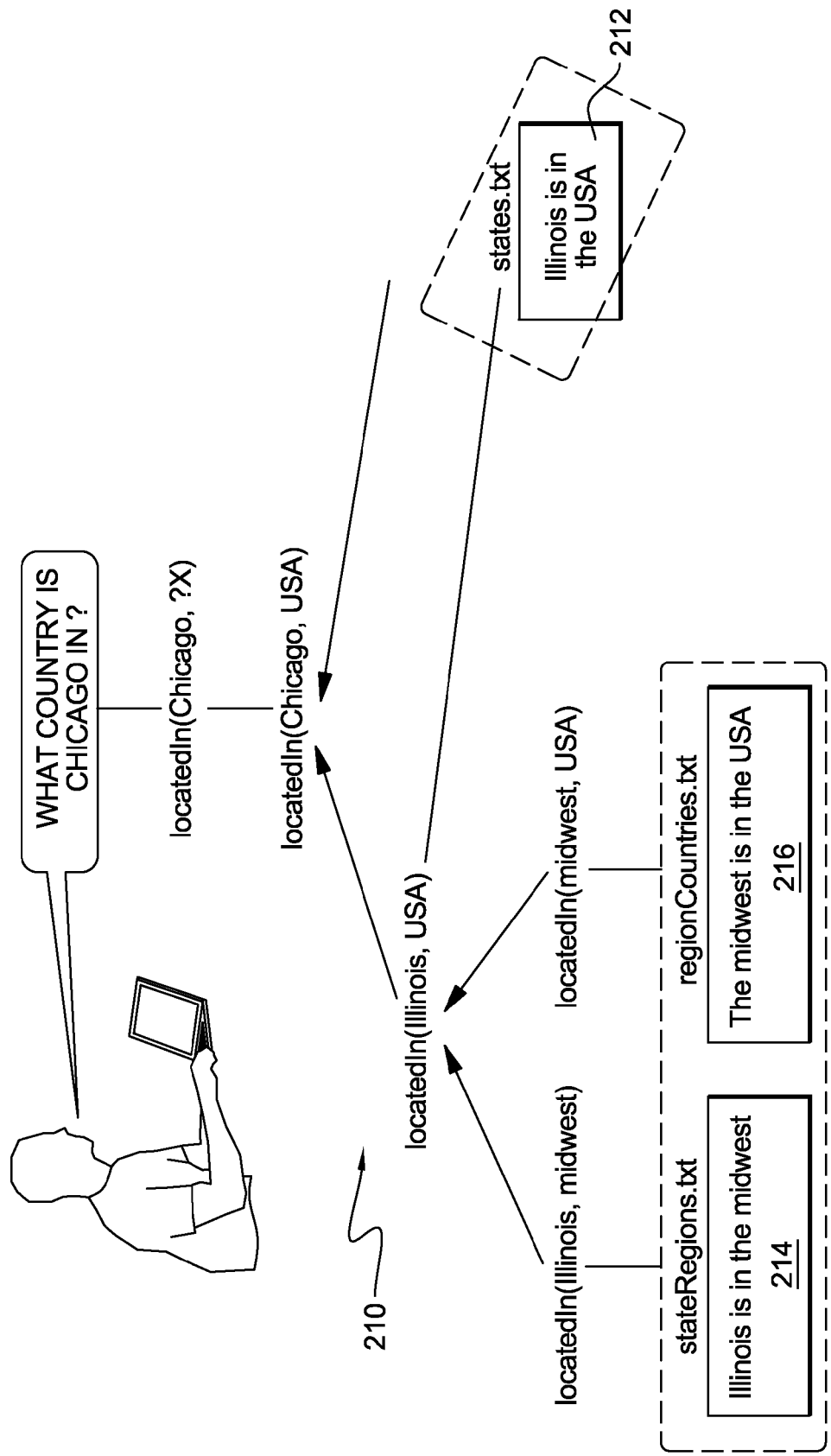
FIG. 5 shows an assertion that has two sets of support.

FIG. 4 shows an example: a question such as "What country is Chicago in?" might be answered by separate documents 202, 204 that state that "Chicago is in Illinois" and that "Illinois is in the USA." Once a system has derived a conclusion (e.g., that Chicago is in the USA), it may be expected to provide support for that conclusion by citing original sources.

There may be multiple distinct proofs that can be found for any given conclusion. Each of these proofs will involve some set of assertions that are directly asserted in source material. Any given assertion may be stated in one or more sources. Some assertions are "leaves" of the proof tree; they occur only in the source material and are not computed from other assertions. Non-leaf assertions are derived from other assertions and may be directly stated in the sources. A leaf assertion is supported by any document that asserts it. A non-leaf assertion is supported by any document that asserts it or by the documents that support for each of the assertions that it was directly computed from. For example, in FIG. 5, the assertion 210 locatedIn(Illinois, USA) has two alternative sets of support: states.txt 212, which directly asserts it, and stateRegions.txt 214 plus regionCountries.txt 216, which support each of the assertions directly used to compute it.

Figure 6:
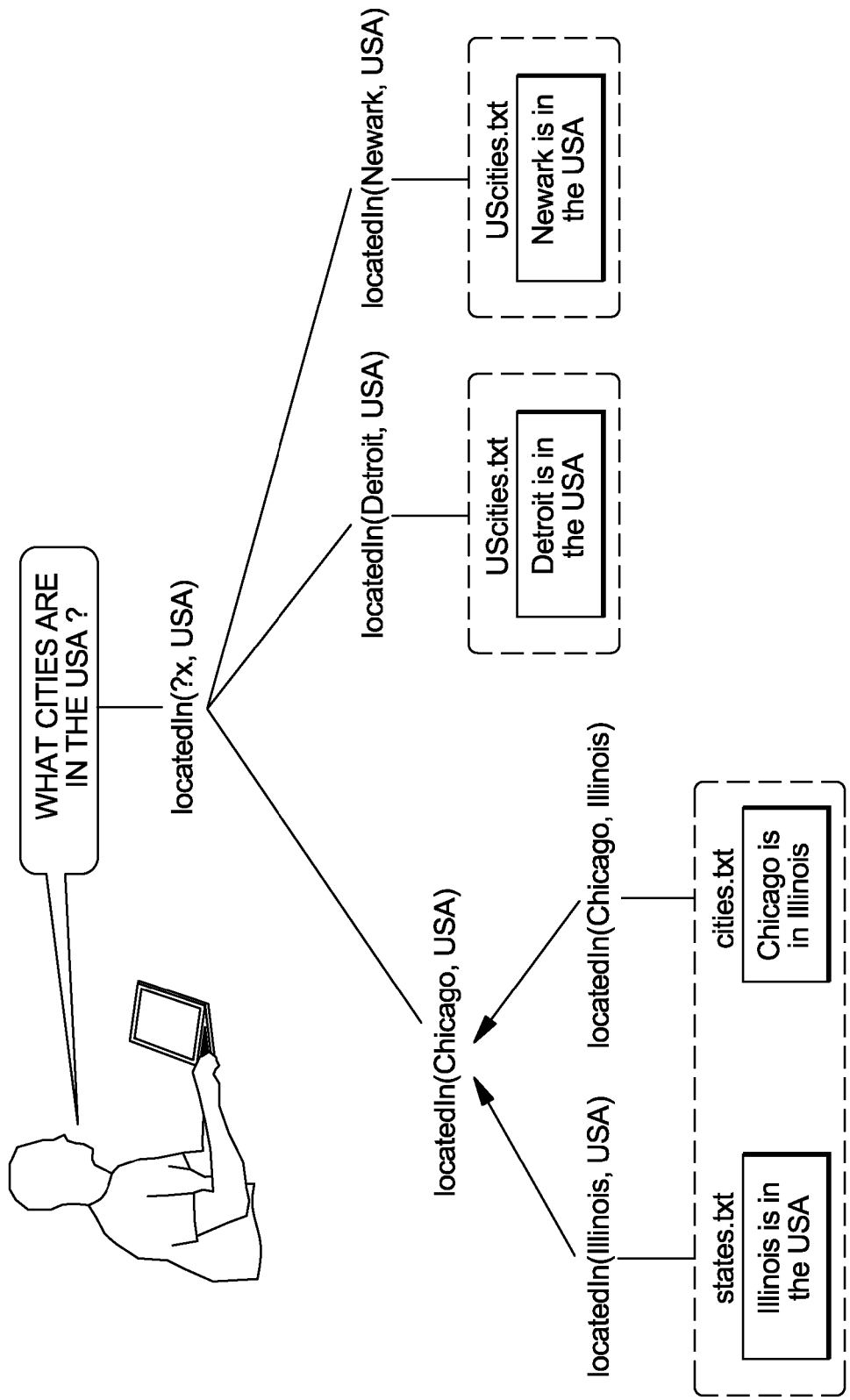
FIG. 6 shows a query that has several answers.

Some queries have responses that have multiple instances, each with one or more supporting documents. FIG. 6 illustrates this: "What cities are in the USA?" has many different answers and some of those answers may be asserted in a single document while others may emerge only from the combination of multiple documents.

Figure 7:
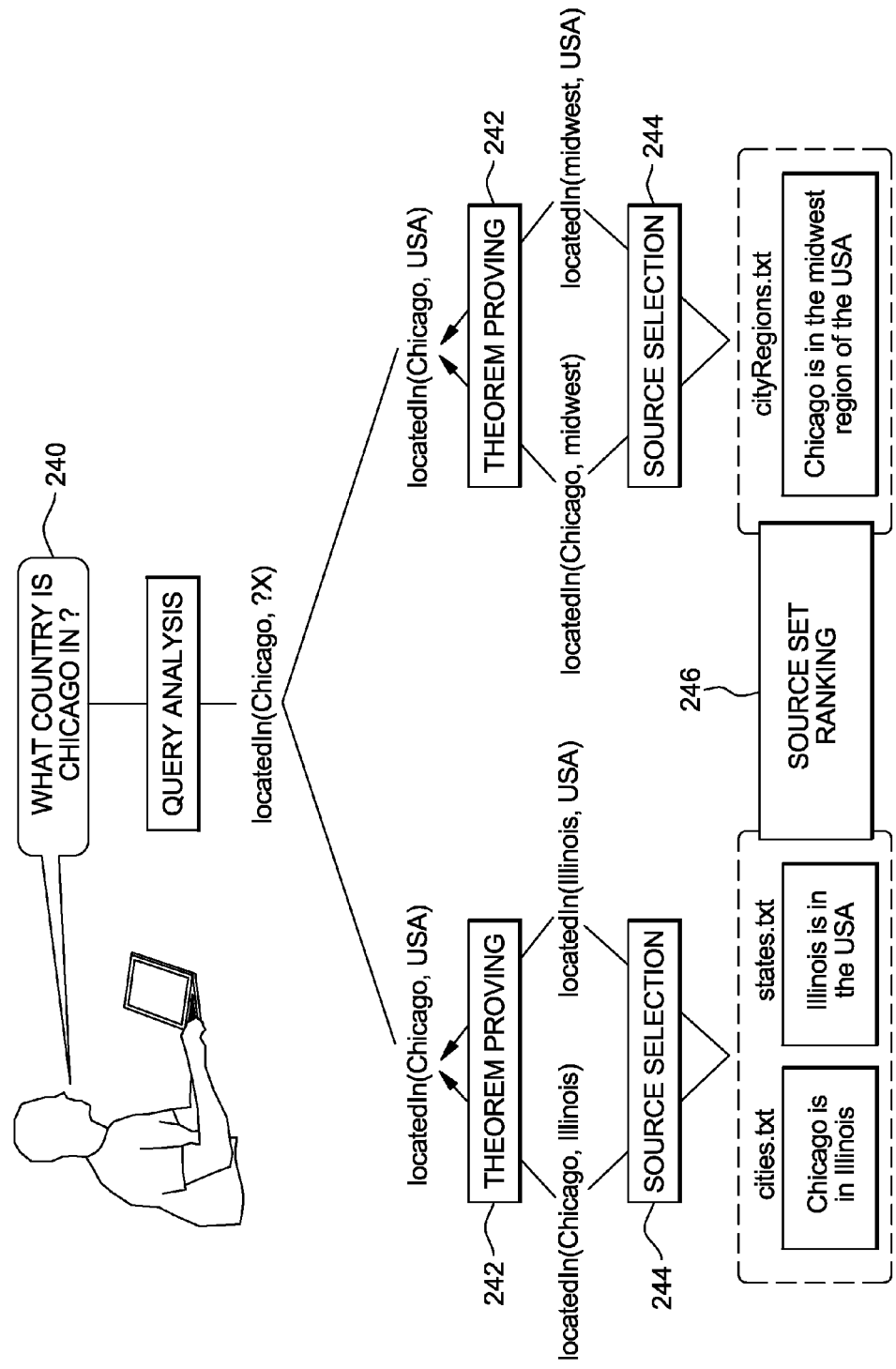
FIG. 7 shows the use of Query Analysis in an embodiment of the invention.

FIG. 7 generally illustrates an example of the implementation of an embodiment of the invention. In this implementation, a query 240 is analyzed, and a logical proof is formulated that has a conclusion that is the answer to the query. Theorem proving 242 is used to generate statements that establish that proof, and source selection 244 is used to identify sources for those statements. If more than one proof is formulated, the sets of documents that establish those proofs may be ranked 246.

Figure 8:
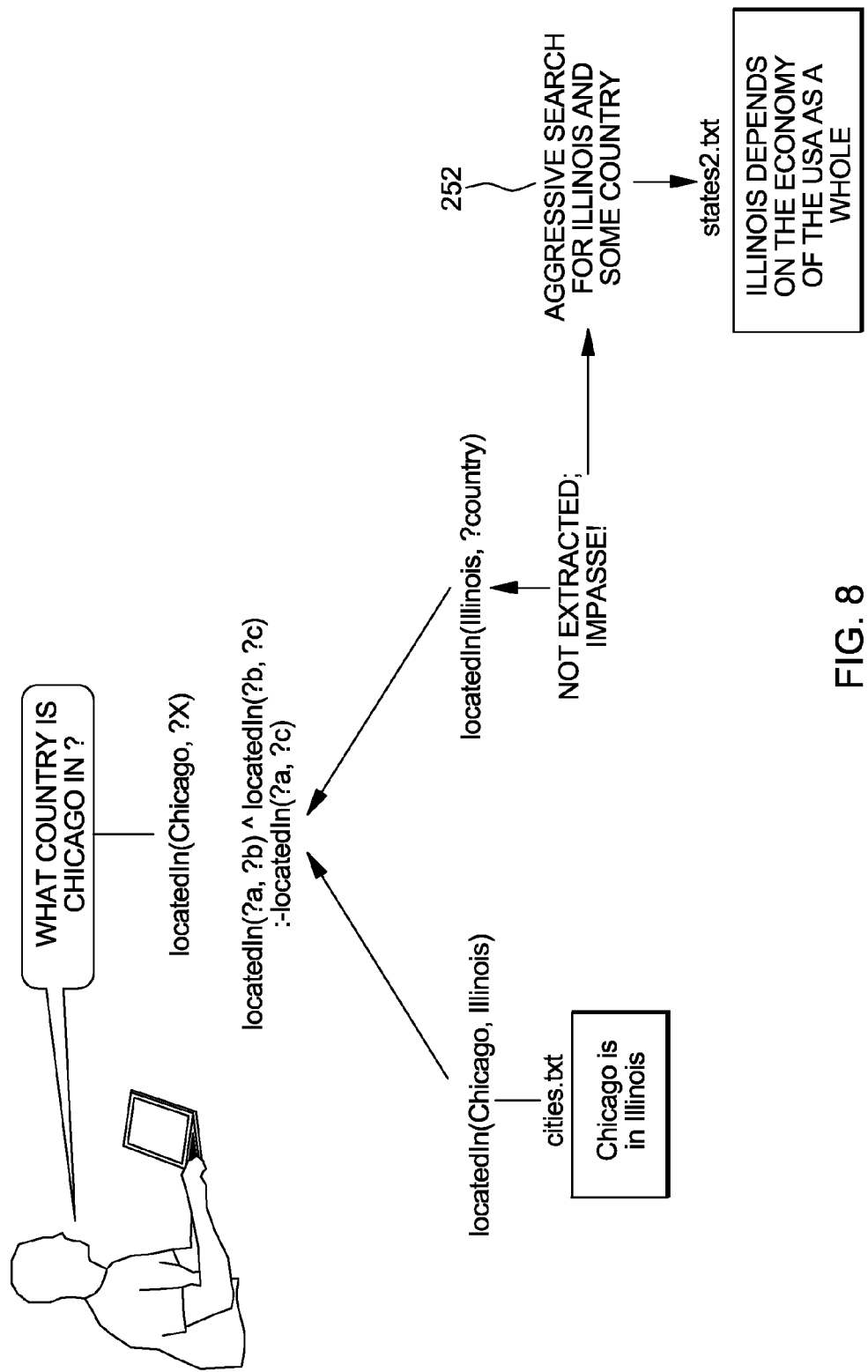
FIG. 8 shows the use of a semantic search in an embodiment of the invention.

With reference to FIG. 8, if Theorem-Proving reaches an empasse, an imprecise semantic search, represented at 252, may be done to address that subgoal.

FIG. 9 shows a user interface 256 that may be used to label the instances, shown in FIG. 6, that a set of documents supports.

Figure 10:
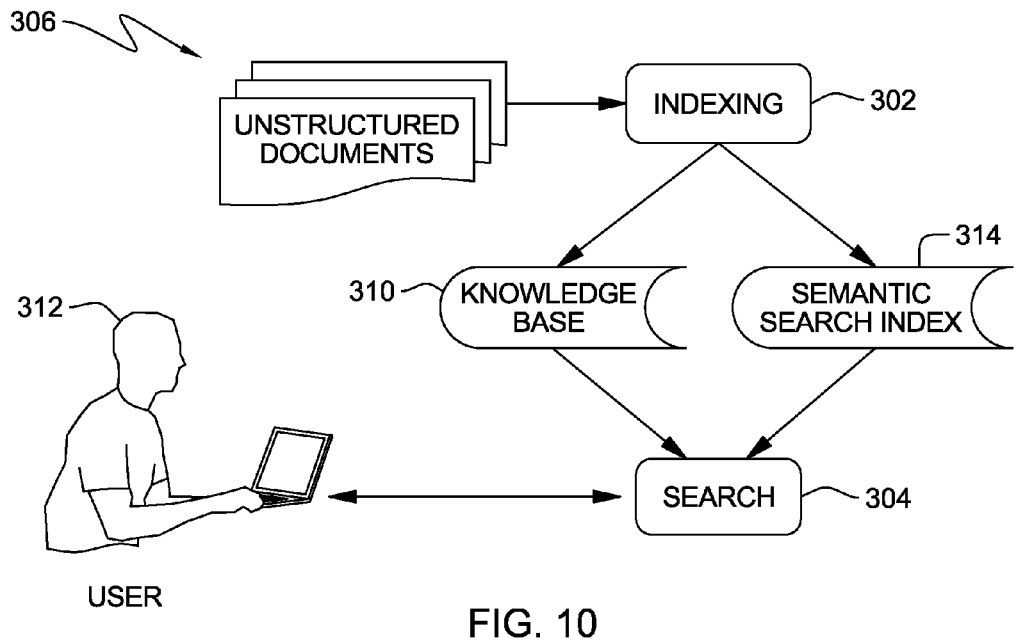
FIG. 10 illustrates a system embodying this invention.

With reference to FIG. 10, an embodiment of the invention includes indexing 302 and searching 304. Generally, at indexing time, unstructured documents 306 are indexed in order to form a knowledge base 310; and at search time, that knowledge base is used to answer a query from a user 312. Also, as mentioned above, semantic searching 314 may be used to augment theorem-proving.

Figure 11:
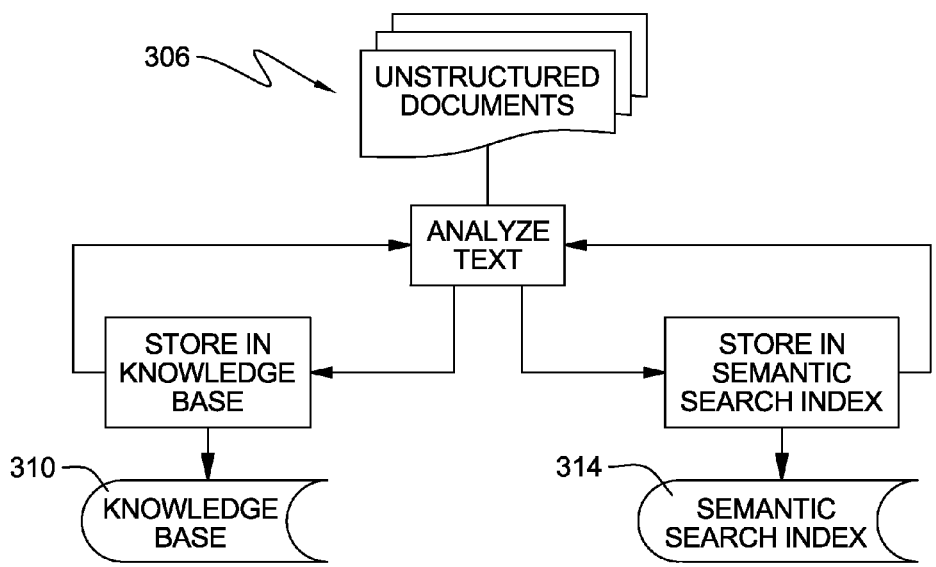
FIG. 11 is a chart showing a procedure used at indexing time in accordance with an embodiment of the invention.
Figure 12:
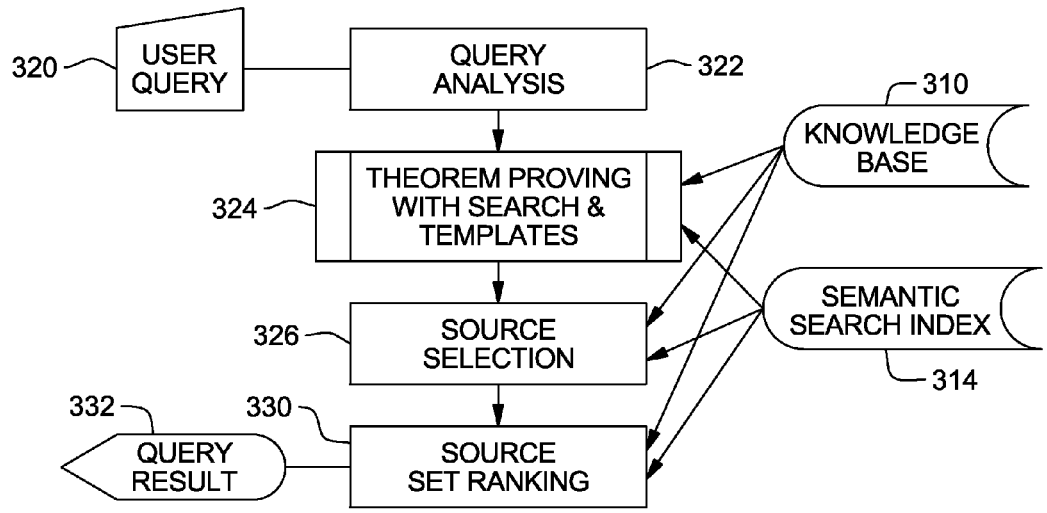
FIG. 12 illustrates a procedure used at search time in accordance with an embodiment of the invention.

FIG. 11 shows in more detail the operation of an embodiment of the invention at indexing time. As illustrated in this Figure, at indexing time, given an unstructured (e.g., text) corpus, a structured repository (e.g., knowledge base, search index) of assertions is built, for example, using traditional knowledge extraction technologies (Indexing). For each assertion, which source (e.g. document, passage) asserted it, is recorded FIG. 12 shows in more detail the operation of an embodiment of the invention at search or run time. With reference to this Figure, at run time, given a query 320 and a knowledge base 310, query analysis 322 is used to formalize the query (Query Analysis). Given the formal query, Theorem Proving with Search Templates 324 is used to generate proofs of statements that match the query (Theorem Proving). For each proof, source selection 326 is used to generate a set of documents (Document Selection). This may be done by, for each assertion A that is a direct antecedent of the conclusion, either choosing a source that asserts A, or iterating over the antecedents of A. Source Set Ranking 330 is used to order the sets of documents based, for example, on relevance, parsimony, etc. (Document Set Ranking). Query result 332 is then provided.

Queries may be answered in a variety of ways. For instance, in one embodiment, each answer to the query gets exactly one set of resources to support it. Alternatively, redundant proofs may be provided. If the system finds more than one proof for an answer, the system returns at most one set of sources to justify each proof. Also, redundant support for a proof may be provided. For each proof, multiple sets of sources can be presented as alternative justifications.

In an embodiment, the invention can be used to explain how the answer was derived. This can be done, for example, with a graph, structured assertions, or generated natural language text. This is useful for power users who want to know why some set of results were returned. This feature also may help convince users that the result set is worth reviewing, and may help users distinguish among logically equivalent sets.

Any suitable procedures or technologies may be used to implement these steps, including existing technology (e.g., Document Set Ranking could be performed by extending algorithms for ranking individual documents).

Figure 13:
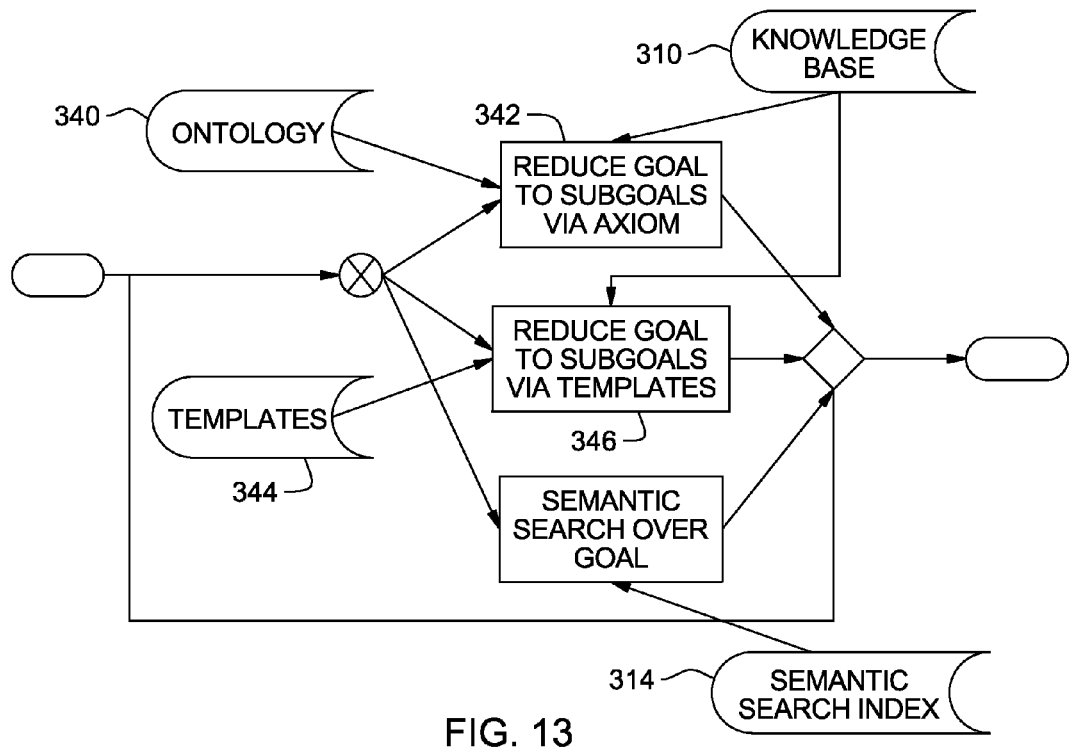
FIG. 13 shows a chart that illustrates Theorem Proving with Search & Template.

With reference to FIG. 13, Theorem Proving may be done with a search and template technique. In this process, as represented at 340 and 342, ontology may be used to reduce goals to subgoals via ariom. As represented at 344 and 346, templates may also be used to reduce goals to subgoals. As mentioned above, if theorem-proving reaches an empasse, an imprecise semantic search 350 may be done to address that subgoal. If that search succeeds, the subgoal succeeds and the search results are sources for that subgoal.

In an embodiment of the invention, the theorem prover finds one or more proofs, and then documents are selected and ranked. If the theorem prover returns all possible proofs, then the source selection and ranking processes have all possible results to consider. However, getting all possible proofs is usually not necessary or even desirable.

One embodiment of the invention allows information about sources to inform steps the theorem proving, intermingling those steps.

Theorem proving is essentially a search process; and could weight the search using factors like whether a source is already being used for other premises of the proof, and whether a source is particularly relevant to the original query.

Embodiments of the invention provide a number of important advantages. For instance, the invention may provide an answer to a query even if there is no single document that completely justifies some answer. The invention enables a user to find sets of documents that together combine to satisfy distinct elements of a query. The documents are evaluated separately, and not interpreted as complementary. The invention produces results for which every set returned provides all the information needed for one conclusion.

Thus, methods, systems, and computer program products for inference-driven multi-source semantic search have been described. In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

The invention claimed is:

1. A method of searching for information using a knowledge base, comprising:
   receiving a query;
   formulizing the query, including dividing the query into a plurality of parts and forming a semantic representation of each of the plurality of parts;
   for each of said parts, identifying one or more documents, using the knowledge base and the semantic representation of said each part, that provides relevant information for said each part in a defined manner; and
   combining the information from said documents to provide an answer to the query.

2. The method according to claim 1, wherein:
   the query includes text;
   the dividing includes separating the text of the query into a plurality of text segments; and
   the identifying includes, for each of the text segments, identifying said one or more documents, by using the knowledge base, that provides relevant information for said each text segment in said defined manner.

3. The method according to claim 1, wherein:
   the dividing includes formulating a logical proof having a conclusion that is an answer to the query, and a sequence of statements that establish said conclusion; and
   the identifying includes generating a proof of said conclusion by using the knowledge base to identify a set of two or more documents that assert said sequence of statements.

4. The method according to claim 3, wherein each of said sequence of statements is asserted by one of said documents.

5. The method according to claim 4, wherein no one of the documents proves said conclusion, and said proof requires all of the documents in said set of documents.

6. The method according to claim 3, wherein the generating includes generating a plurality of proofs of said conclusion, each of said proofs having an associated sequence of statements.

7. The method according to claim 6, wherein the generating a plurality of proofs includes using the knowledge base to identify, for each of said plurality of proofs, an associated set of documents that assert the sequence of statements associated with said each proof.

8. The method according to claim 7, wherein the generating a plurality of proofs further includes ordering the sets of documents according to a given one or more criteria.

9. The method according to claim 3, wherein the knowledge base includes a repository of assertions, and the method comprises the further step of building said repository from a defined group of documents.

10. The method according to claim 9, wherein:
    said building includes linking each of the assertions to one of the documents, of said defined group of documents, that asserts said each assertion; and
    the generating includes, for each of said statements, identifying one of the assertions in the knowledge base that asserts said statement, and using said identified assertions and said linking to identify one of the documents, of said defined group of documents, that assert said identified assertion.

11. A system for searching for information using a knowledge base, comprising one or more processor units configured for:
    receiving a query;
    formulizing the query, including dividing the query into a plurality of parts and forming a semantic representation of each of the plurality of parts;
    for each of said parts, identifying one or more documents, using the knowledge base and the semantic representation of said each part, that provides relevant information for said each part in a defined manner; and
    combining the information from said documents to provide an answer to the query.

12. The system according to claim 11, wherein:
    the query includes text;
    the dividing includes separating the text of the query into a plurality of text segments; and
    the identifying includes, for each of the text segments, identifying said one or more documents, by using the knowledge base, that provides relevant information for said each text segment in said defined manner.

13. The system according to claim 11, wherein:
    the dividing includes formulating a logical proof having a conclusion that is an answer to the query, and a sequence of statements that establish said conclusion; and the identifying includes generating a proof of said conclusion by using the knowledge base to identify a set of two or more documents that assert said sequence of statements.

14. The system according to claim 13, wherein the generating includes:
   generating a plurality of proofs of said conclusion, each of said proofs having an associated sequence of statements;
   using the knowledge base to identify, for each of said plurality of proofs, an associated set of documents that assert the sequence of statements associated with said each proof; and
   ordering the sets of documents according to a given on or more criteria.

15. The system according to claim 13, wherein:
   the knowledge base includes a repository of assertions built from a defined group of documents;
   each of the assertions is linked to one of the documents, of said defined group of documents, that asserts said each assertion; and
   the generating includes, for each of said statements, identifying one of the assertions in the knowledge base that asserts said statement, and using said identified assertions and said links to identify one of the documents, of said defined group of documents, that assert said identified assertion.

16. An article of manufacture comprising:
   at least one tangible computer readable medium having computer readable program code logic to execute machine instructions in one or more processing units to search for information using a knowledge base, said computer readable program code logic, when executing, performing the following:
   receiving a query;
   formulizing the query, including dividing the query into a plurality of parts and forming a semantic representation of each of the plurality of parts;
   for each of said parts, identifying one or more documents, using the knowledge base and the semantic representation of said each part, that provides relevant information for said each part in a defined manner; and
   combining the information from said documents to provide an answer to the query.

17. The article of manufacture according to claim 16, wherein:
   the query includes text;
   the dividing includes separating the text of the query into a plurality of text segments; and
   the identifying includes, for each of the text segments, identifying said one or more documents, by using the knowledge base, that provides relevant information for said each text segment in said defined manner.

18. The article of manufacture according to claim 16, wherein:
   the dividing includes formulating a logical proof having a conclusion that is an answer to the query, and a sequence of statements that establish said conclusion; and
   the identifying includes generating a proof of said conclusion by using the knowledge base to identify a set of two or more documents that assert said sequence of statements.

19. The article of manufacture according to claim 18, wherein the generating includes:
   generating a plurality of proofs of said conclusion, each of said proofs having an associated sequence of statements; and
   using the knowledge base to identify, for each of said plurality of proofs, an associated set of documents that assert the sequence of statements associated with said each proof.

20. The article of manufacture according to claim 18, wherein:
   the knowledge base includes a repository of assertions built from a defined group of documents, and each of the assertions is linked to one of the documents; and
   the generating includes, for each of said statements, identifying one of the assertions in the knowledge base that asserts said statement, and using said identified assertions and said links to identify one of the documents, of said defined group of documents, that assert said identified assertion.

* * * * *